US008205723B2

(12) United States Patent
Liao

(10) Patent No.: US 8,205,723 B2
(45) Date of Patent: Jun. 26, 2012

(54) BRAKE APPARATUS FOR CARTS WITH THREE OR MORE WHEELS SUCH AS GOLF BAG CARTS, BABY STROLLERS AND THE LIKE

(75) Inventor: Gordon Liao, Yung Kang (TW)

(73) Assignee: Unique Product & Design Co., Ltd., Yung Kang, Tainan Hsien (TW)

( * ) Notice: Subject to any disclaimer, the term of this patent is extended or adjusted under 35 U.S.C. 154(b) by 387 days.

(21) Appl. No.: 12/575,541

(22) Filed: Oct. 8, 2009

(65) Prior Publication Data

US 2011/0083928 A1    Apr. 14, 2011

(51) Int. Cl.
*B62B 5/04* (2006.01)
*F16D 65/14* (2006.01)
*F16C 1/12* (2006.01)
(52) U.S. Cl. ............. 188/19; 188/2 D; 188/31; 74/501.6
(58) Field of Classification Search ............ 188/19, 188/20, 21, 22, 2 D, 2 F, 31, 71.1, 73.1; 280/264, 280/33.994; 74/501.6, 502.4
See application file for complete search history.

(56) References Cited

U.S. PATENT DOCUMENTS

| 5,460,399 A * | 10/1995 | Baechler et al. ............... 188/20 |
| 6,170,615 B1 * | 1/2001 | Cheng ............................. 188/20 |
| 6,341,672 B1 * | 1/2002 | Yang et al. ..................... 188/20 |

FOREIGN PATENT DOCUMENTS

JP    09277938 A   * 10/1997

\* cited by examiner

*Primary Examiner* — Thomas J Williams
(74) *Attorney, Agent, or Firm* — Alan Kamrath; Kamrath IP Lawfirm, PA

(57) ABSTRACT

A brake apparatus for carts with three or more wheels such as golf bag carts, baby strollers and the like includes a hand brake control assembly fixed on the cart frame and having a body and a lug in pinned connection with the body. Brake activation can be done through a pull on the lug. On the other hand, brake release is achieved by pressing springy pushbuttons on both sides of the lug to escape the clipping pin from the indent. A brake pole set, fixed on a rear wheel axle tube, is capable of offering a buffer mechanism, which avoids potential destruction to the wheel. A brake wire enables easy operation and achieves an automatic lock during braking, which substantially prevents the lapse of releasing the brake by the user.

3 Claims, 15 Drawing Sheets

BRAKE APPARATUS FOR CARTS WITH THREE OR MORE WHEELS SUCH AS GOLF BAG CARTS, BABY STROLLERS AND THE LIKE

BACKGROUND OF THE INVENTION

1. Field of the Invention

This invention relates generally to a brake apparatus for carts with three or more wheels such as golf bag carts, baby strollers and the like and, more particularly, to one featuring handiness for operating, where a brake lug is a safety measure designed for the automatic lock of the brake which substantially prevents a lapse of releasing the brake by a user, and where a brake pole set is capable of offering a buffer mechanism, which avoids potential destruction to the wheel.

2. Description of the Prior Art

Brake apparatus of prior baby strollers is roughly shown in FIGS. 1 & 2, where the axle tube 11 is provided with a brake pedal 12 on its middle portion. By tilting at both sides of the brake pedal 12 to push a brake pole 13 outward to penetrate through a hollow 15 of the wheel 14, the stroller brakes to a stop. The return of the brake pole 13 is subject to the resilient force of a springy member 16. However, the brake pedal 12 is located at the bottom of the stroller, where visual sight is always hindered, gravely deteriorating operation and easily being touched by the foot. Moreover, once the brake pole 13 is not aligned to the hollow 15 of the wheel 14, the stroller can't brake to a stop. At this moment, if the user still steps on the brake pedal 12 with great strength, the brake pedal 12 or the wheel 14 is easily destructed. These shortcomings absolutely deserve to be improved.

SUMMARY OF THE INVENTION

An object of this invention is therefore to provide a brake apparatus for carts with three or more wheels such as golf bag carts, baby strollers and the like that feature handiness for operation.

Another object of this invention is to provide a brake apparatus for carts with three or more wheels such as golf bag carts, baby strollers and the like, where a brake lug is a safety measure designed for the automatic lock of the brake which substantially prevents a lapse of releasing the brake by a user.

A further object of this invention is to provide a brake apparatus for carts with three or more wheels such as golf bag carts, baby strollers and the like, where a brake pole set is capable of offering a buffer mechanism, which avoids potential destruction to the wheel.

To accomplish the aforesaid objects, this invention provides a brake apparatus for carts with three or more wheels such as golf bag carts, baby strollers and the like, which comprises a hand brake control assembly fixed on the cart frame and having a body and a lug in pinned connection with thereon. The body is set up with an indent at its upper inner side, and the lug is provided with a springy pushbutton at each of its two laterals. The pushbutton joins a threaded element at its bottom. The threaded element joins a clipping pin at its one end. The clipping pin and the indent are clipped to each other automatically through a pull on the lug. The brake is released by pressing the springy pushbuttons on both sides of the lug, which releases the clipping pin from the indent. A brake pole set is fixed on a rear wheel axle tube and has a binder which is provided with a tie mount in its interior. The tie mount is provided with a slider and has a linking pole at each of its two ends. The linking poles each join a brake pole at the other end. The brake pole is set up in the interior of a base, and a brake spring is put around the brake pole. A brake wire has one end penetrating the body and fixedly coined with the lug and the other end penetrating the binder and the slider and fixedly joined with the tie mount. Accordingly, this enables an easy operation and accomplishes an automatic lock of the brake, which substantially prevents a lapse of releasing the brake by a user.

A buffer mechanism is set up at the brake pole set and includes two buffer tins set up at the other end of the linking pole and located in the base. Two brake poles, set up in both the buffer tin and the base, each has a protruded part in its middle for separation purposes. The end of the brake pole next to the protruded part is lodged in the buffer tin and is put around by a buffer spring, and a buffer space is kept with the buffer spring in the buffer tin. The other end of the brake pole beside the protruded part is lodged in the base and is put around by a spacer and a brake spring. This avoids destruction to the wheel by the brake pole during incomplete operation of the brake.

DETAILED DESCRIPTION OF THE INVENTION

Figure 1:
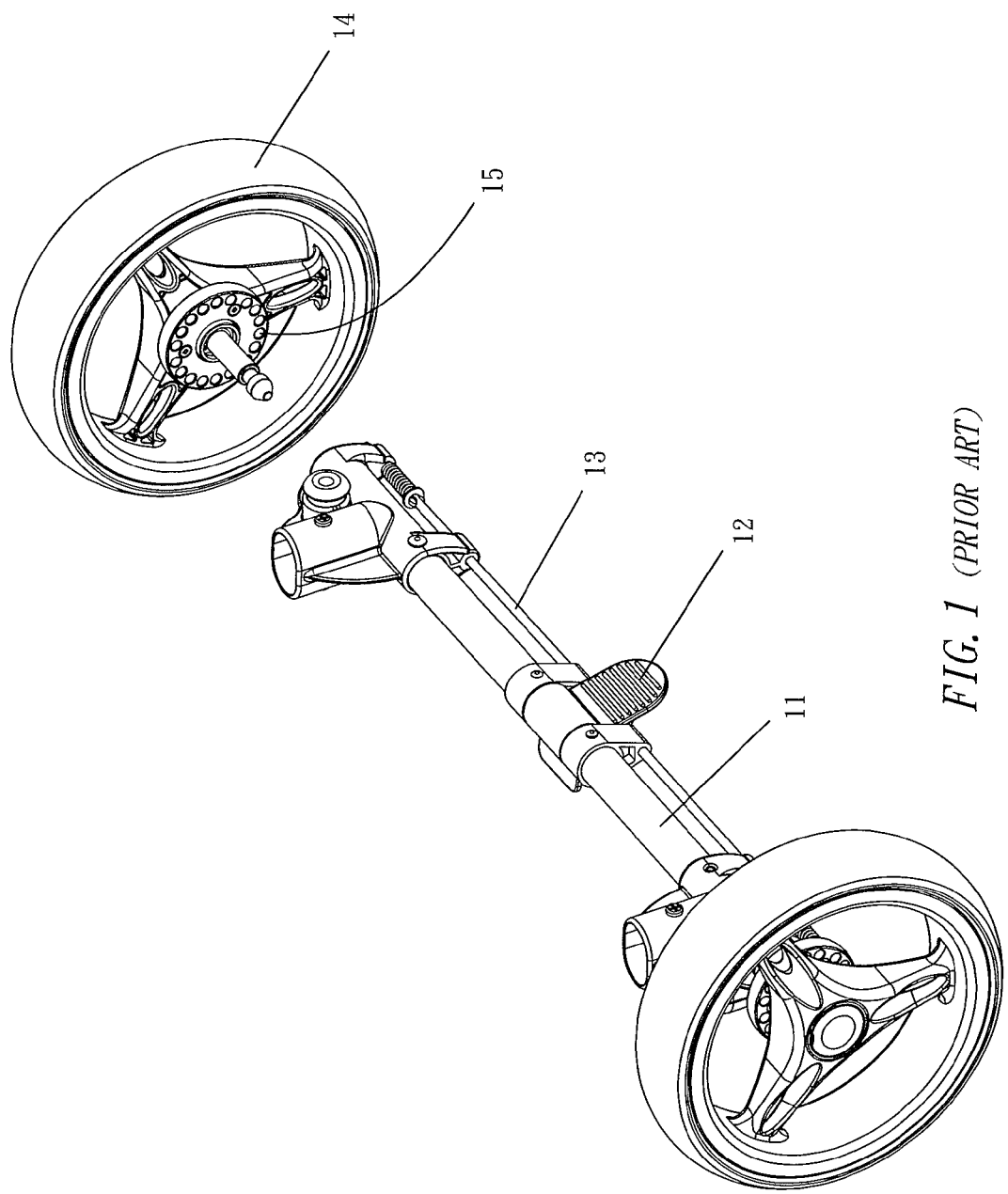
FIG. 1 is a three-dimensional exploded view of the brake apparatus of a prior baby stroller.
Figure 2:
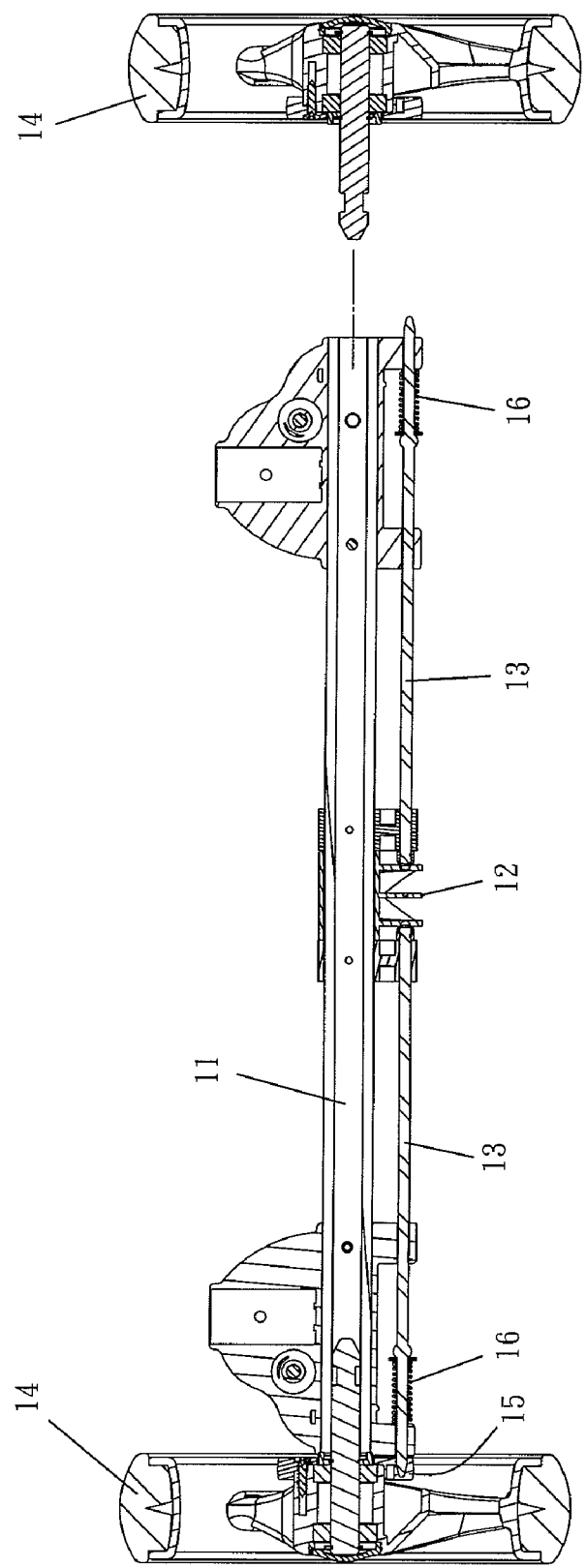
FIG. 2 is an assembled sectional view of the brake apparatus of a prior baby stroller.
Figure 3:
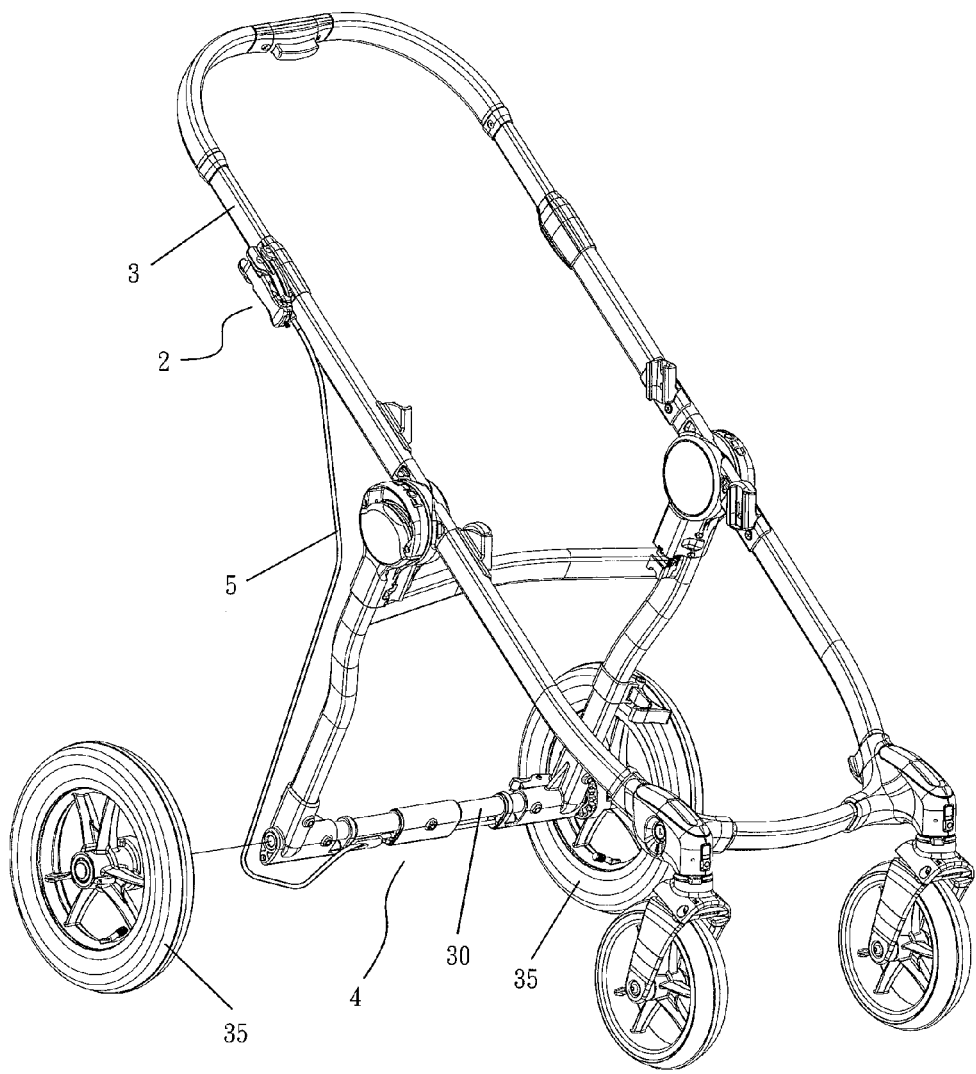
FIG. 3 is a three-dimensional view of this invention mounted on a baby stroller.

The structural trait and its function of this invention is described in detail with reference to the following two preferred embodiments and the accompanying drawings, which would give a thorough comprehension. Referring to FIGS. 3~9, this invention comprises: a hand brake control assembly 2 fixed on the cart frame 3, a brake pole set 4 fixed on the rear wheel axle tube 30, and a brake wire 5 connecting the hand brake control assembly 2 and the rake pole set 4.

Figure 4:
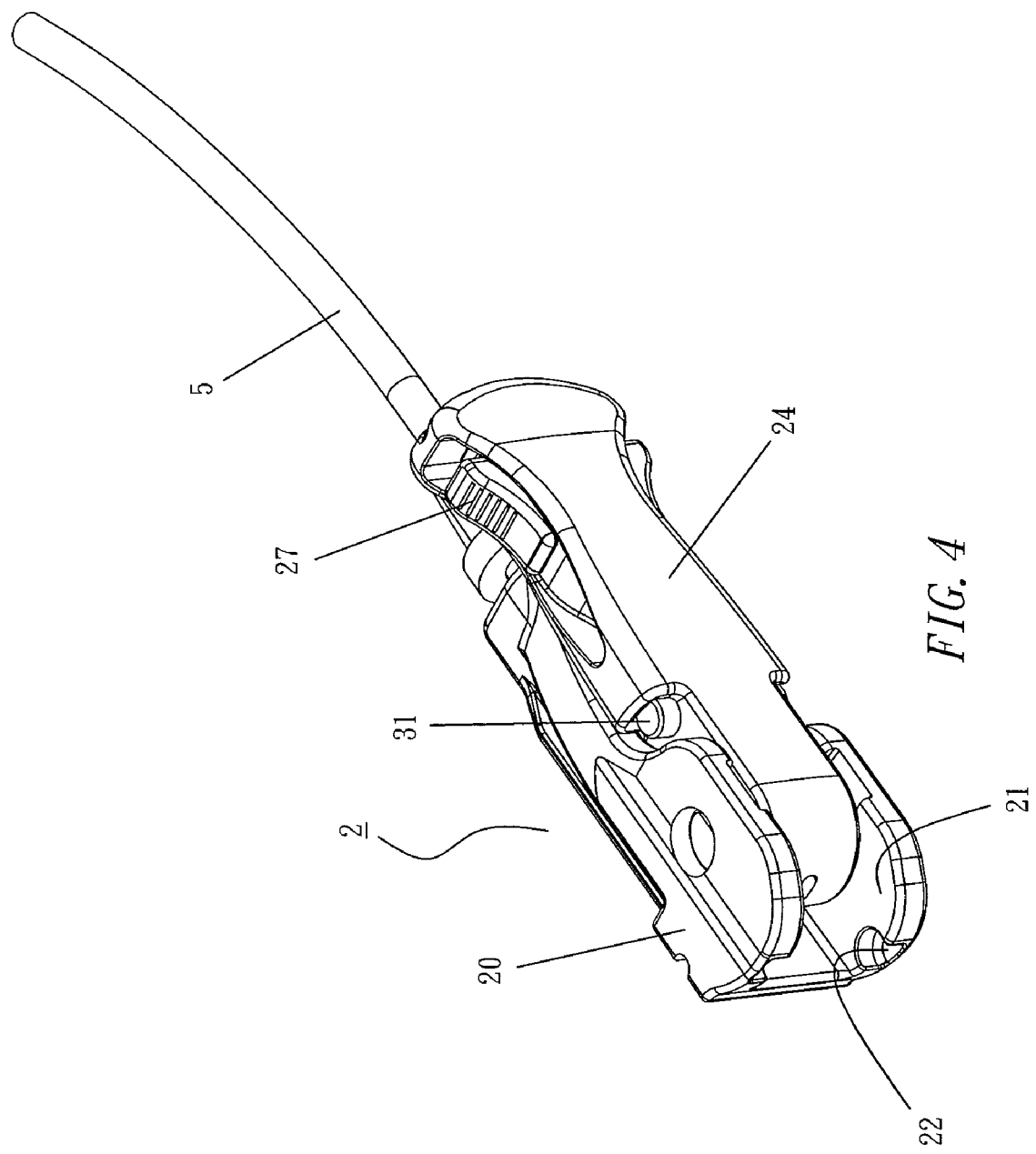
FIG. 4 is a three-dimensional view of the hand brake control assembly of this invention.
Figure 5:
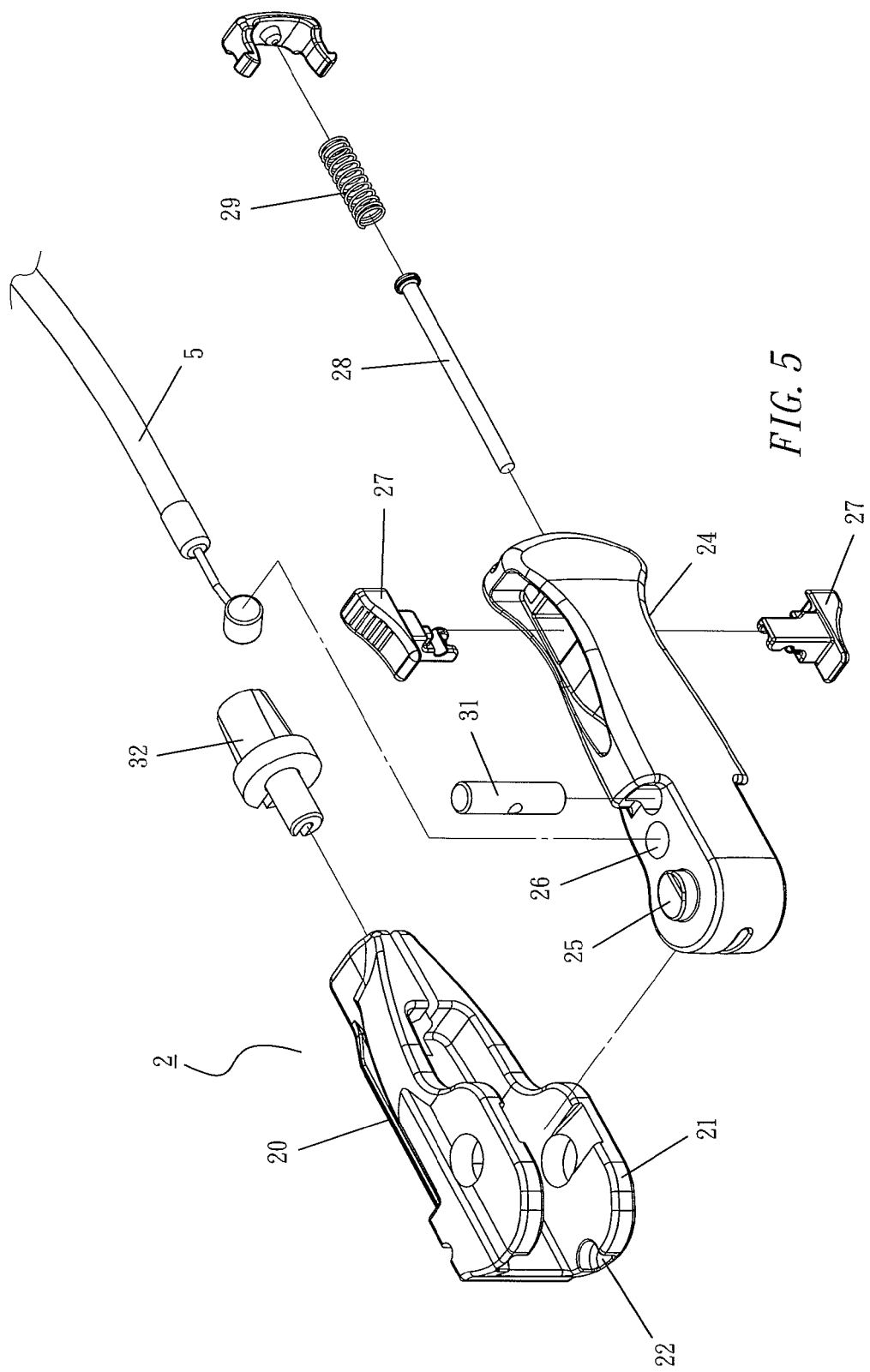
FIG. 5 is a three-dimensional exploded view of the hand brake control assembly of this invention.
Figure 6:
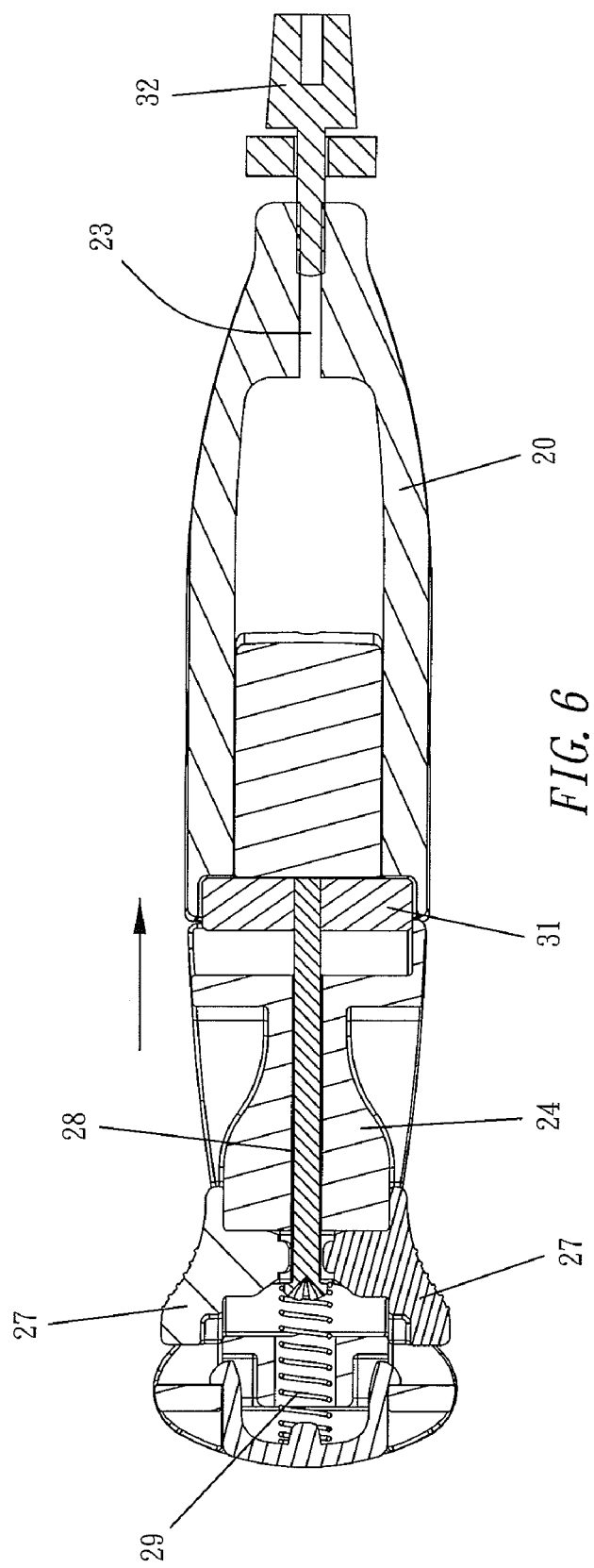
FIG. 6 is an assembled sectional view of the hand brake control assembly of this invention.

The hand brake control assembly 2 is shown in FIGS. 4~6 and includes a body 20 fixed on the cart frame 3 and having a flag plug 21 at each top of its two sides. The flag plug 21 has a tilted arc at the top of its outer side and has an indent 22 at each top of its two inner sides. The body 20 is provided with a through hole 23 at its bottom, for penetration by the brake wire 5. A brake lug 24 is set up in the body 20 and has a camshaft 25 at each top of its two sides and in pinned connection with the corresponding flat plug 21. The camshaft 25 is provided with a fixing hole 26 below it, for fixing of one end of the brake wire 5. Two springy pushbuttons 27 are set up at both sides of the bottom of the lug 24 and join a threaded element 28 at their bottoms. The threaded element 28 is set up in the bottom of the lug 24 with a spring 29 put around it and which empowers the pushbuttons 27 to have a downward force. A clipping pin 31, set up in the top portion of the lug 24, is in threaded joining, at its middle, with the threaded element 28 which follows the move of the pushbutton 27. An adjustable screw 32 is set up in the through hole 23 at the bottom of the body 20, for penetration by the brake wire 5 and for adjustment of the tightness of the brake wire 5.

Figure 7:
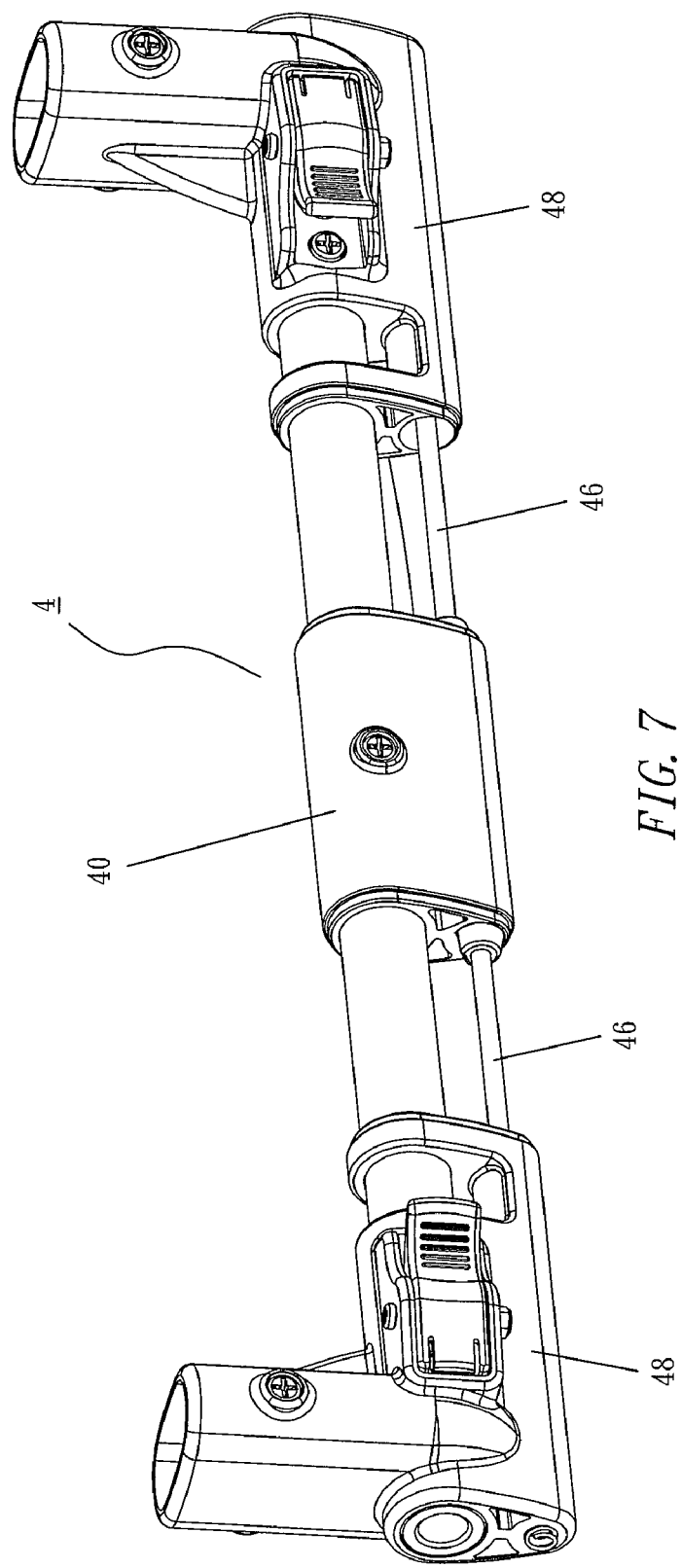
FIG. 7 is a three-dimensional view of the brake pole set of this invention.
Figure 8:
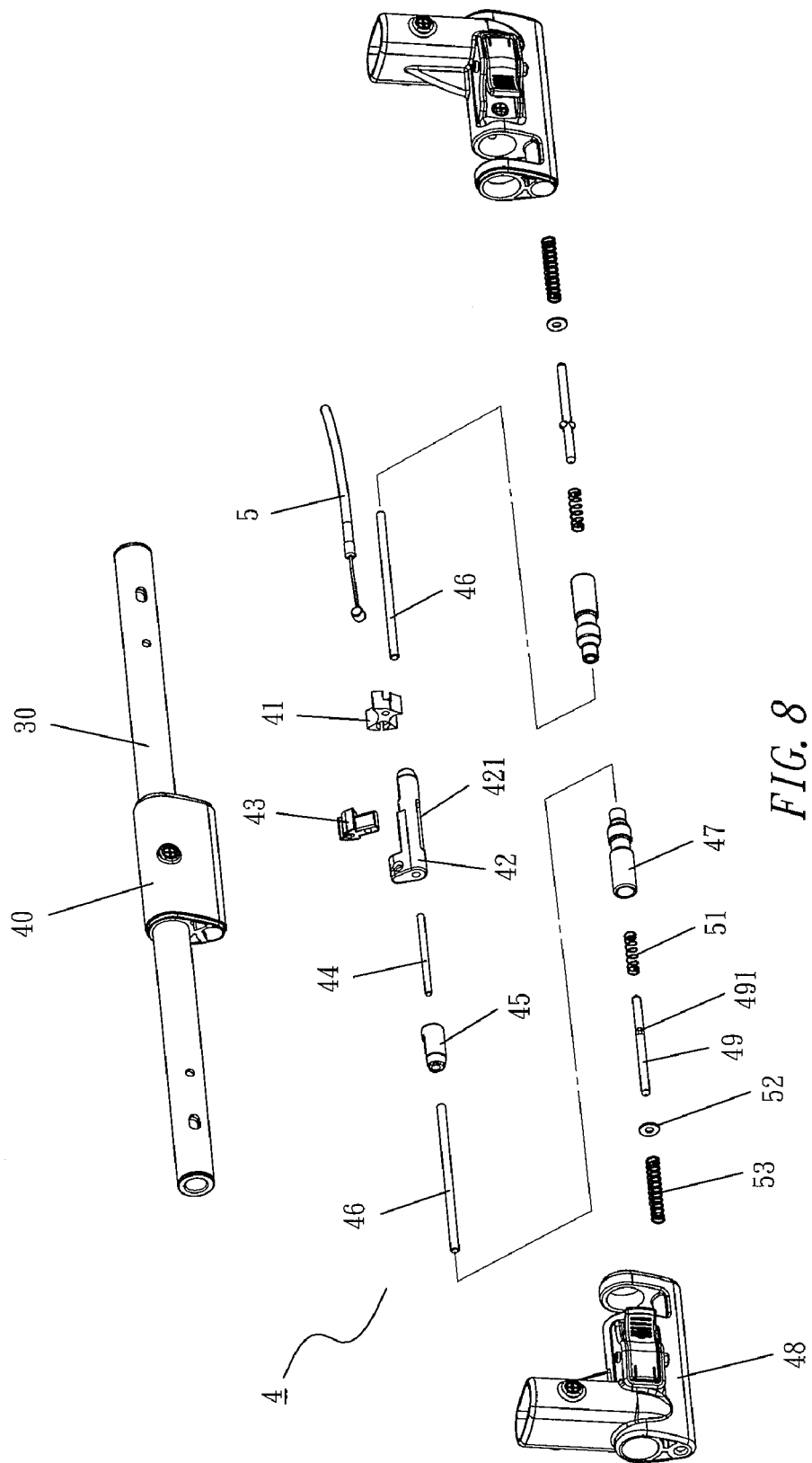
FIG. 8 is a three-dimensional exploded view of the brake pole set of this invention.
Figure 9:
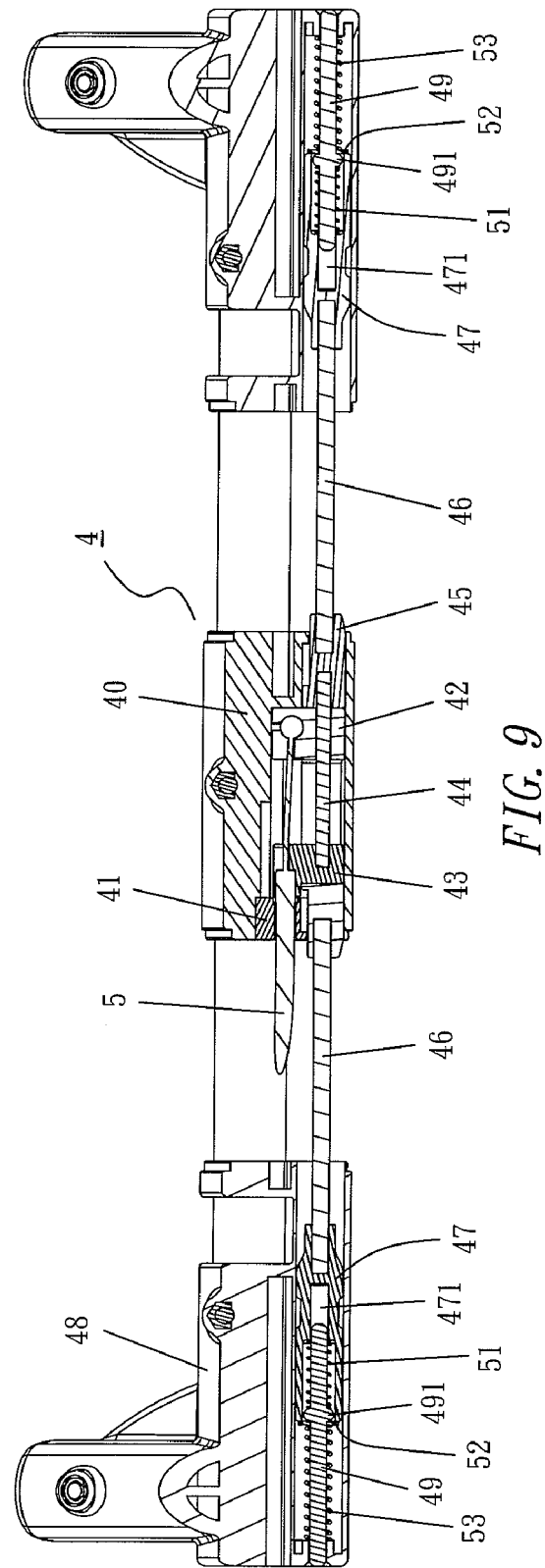
FIG. 9 is an assembled sectional view of the brake pole set of this invention.

The brake pole set 4 is shown in FIGS. 7~9 and includes a binder 40 fixed in the middle of the rear wheel axle tube 30 and having a cover 41 at its one end. A tie mount 42, L in shape, is set up in the binder 40 and has a long trough 421 on its surface. A slider 43 is set up on the long trough 421 of the tie mount 42, for penetration by the other end of the brake wire 5 through the cover 41 and the slider 43, followed by a fixing to the vertical part of the tie mount 42, to position the slider 43 in between the vertical part of the tie mount 42 and the binder 40. An extending pole 44 has one end penetrating the tie mount 42 for fixing and has the other end penetrating a continuing tube 45 for fixing. The continuing tube 45 is fixed in one end of the interior of the tie mount 42. Two linking poles 46 are set up at both sides of the tie mounts 42. Two buffer tins 47, shaping a ladder tube, are set up in the other end of the linking pole 46, which is located in a L-shape base 48. The L-shape base 48 joins the cart frame at its vertical end, shown in FIG. 3. Two brake poles 49, set up in the buffer tin 47 and the base 48, each has a protruded part 491 in its middle for separation purposes. The end of the brake pole 49 next to the protruded part 491 (the end next to the linking pole 46) is lodged in the buffer tin 47 and put around by a buffer spring 51, and a buffer space 471 is kept in the buffer tin 47. The other end of the brake pole 49 is lodged in the base 48 and put around by a spacer 52 and a brake spring 53. The aforementioned buffer tin 47, brake pole 49 and buffer spring 51 constitute a buffer mechanism, where the elasticity of the buffer spring 51 is less than that of the brake spring 53.

The brake wire 5, a steel rope, has one end penetrating the body 20 and fixedly joined to the lug 24 and has the other end penetrating the binder 40 and the slider 43 and fixedly joined to the tie mount 42.

Figure 10:
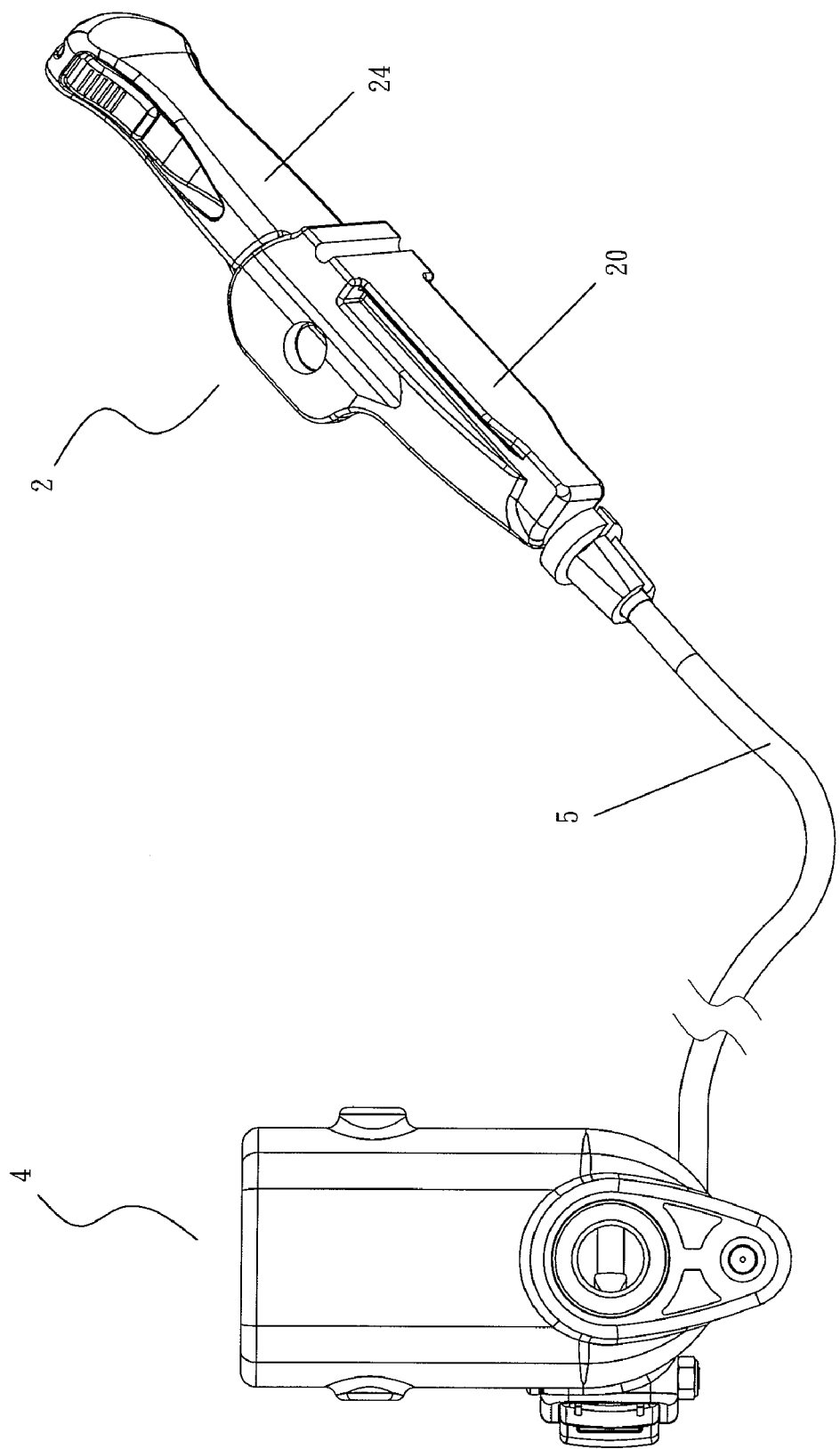
FIG. 10 is a schematic diagram of the motion of the hand brake control assembly during the braking of this invention.
Figure 11:
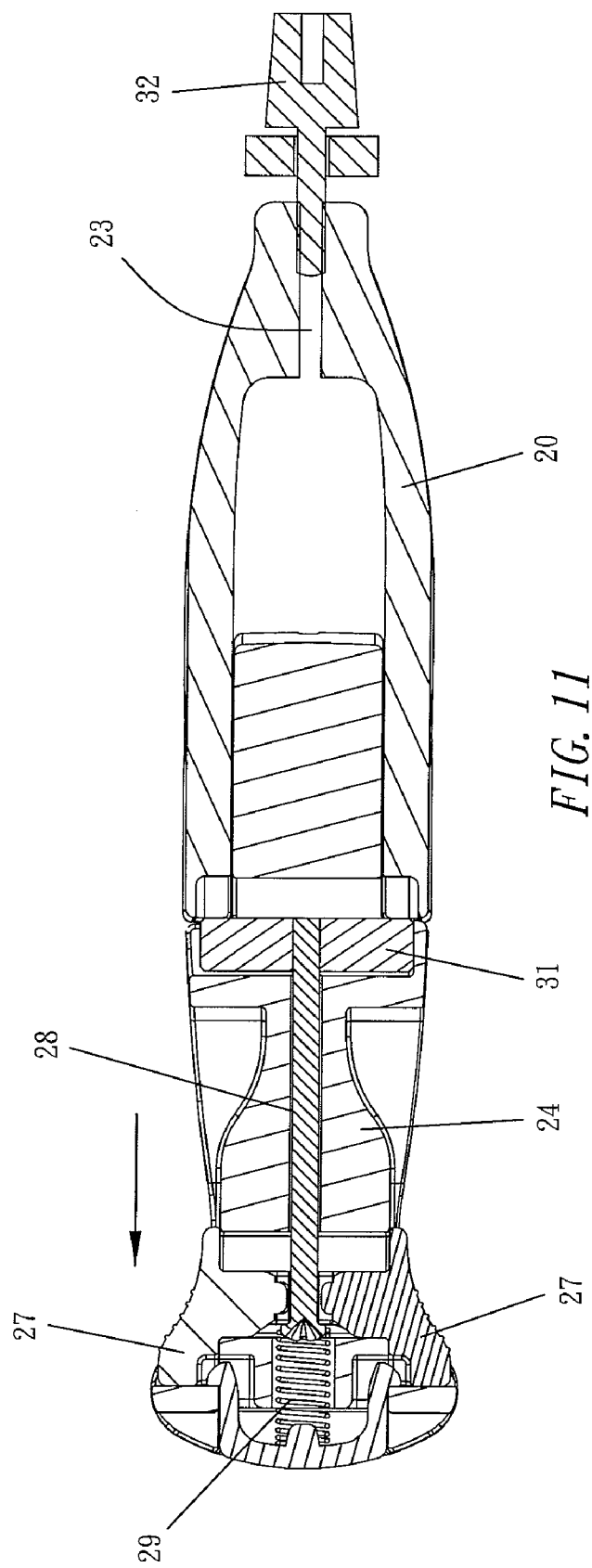
FIG. 11 is a schematic sectional view (I) of the hand brake control assembly during the braking of this invention.
Figure 12:
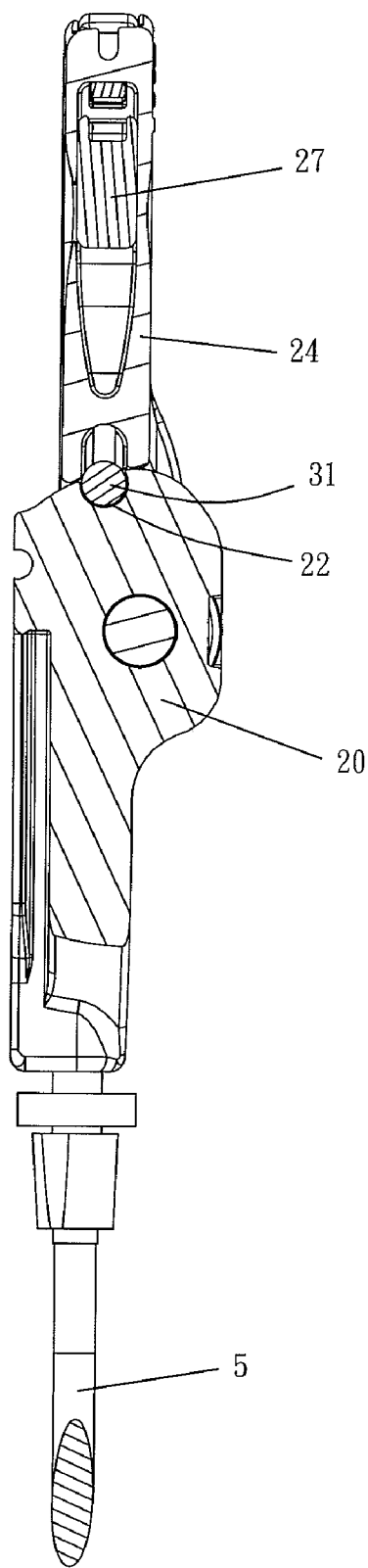
FIG. 12 is a schematic sectional view (II) of the hand brake control assembly during the braking of this invention.
Figure 13:
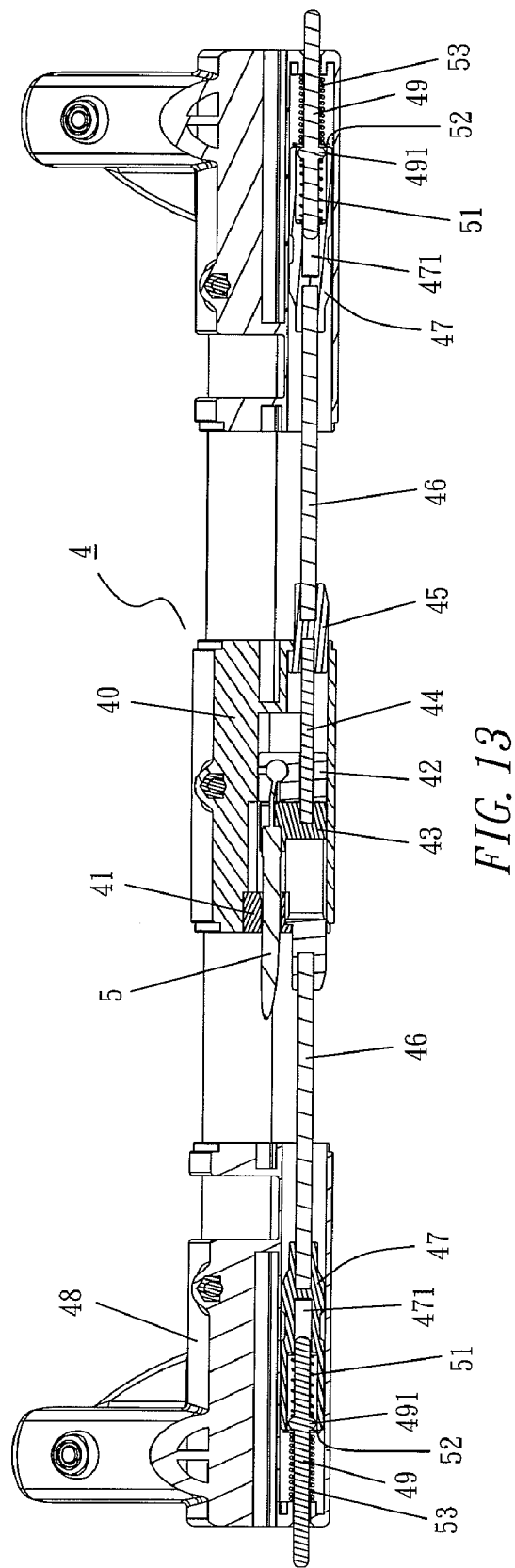
FIG. 13 is a schematic sectional view of the brake pole set during the braking of this invention.

According to the aforesaid structural combination, this invention is shown in FIGS. 3, 4, 6 & 9 in an integral form, where the brake lug 24 is pressed down to stick to the lower part of the body 20 and the spring 29 is in the stretched state. Also, the brake pole 49 is lodged in the base 48. The brake spring 53 and the buffer spring 51 are also in the stretched state. A buffer space 471 is kept with the brake pole 49 and the buffer spring 51 in the buffer tin 47. Once intending to brake, the lug 24 is lifted, which is by the tilt design for the outer sides of the body 20, and the lug 24 with the clipping pin 31 is pushed upward until a straight line is formed by the lug 24 and the body 20, shown in FIGS. 10~12. Meanwhile, the brake wire 5 is drawn to move the tie mount 42 and the slider 43 toward the middle. As the buffer tin 47 and the brake pole 49 are pushed to move outward by the linking pole 46, the brake pole 49 protrudes from the base 48, shown in FIG. 13, for penetration into a hollow of the rear wheel 35 to halt rotation of the rear wheel 35, which results in braking to a stop. At this moment, the brake spring 53 is in a compressed state, the buffer spring 51 is in a stretched state, and the buffer space 471 still exists there. Once the brake lug 24 is pulled upward to its full extent and released, the clipping pin 31 moves down by the resilient force of the spring 29 and is clipped by the indent 22 of the body 20, shown in FIGS. 11 & 12, to achieve the automatic lock of the brake, which substantially prevents a lapse of releasing the brake by the user.

Figure 14:
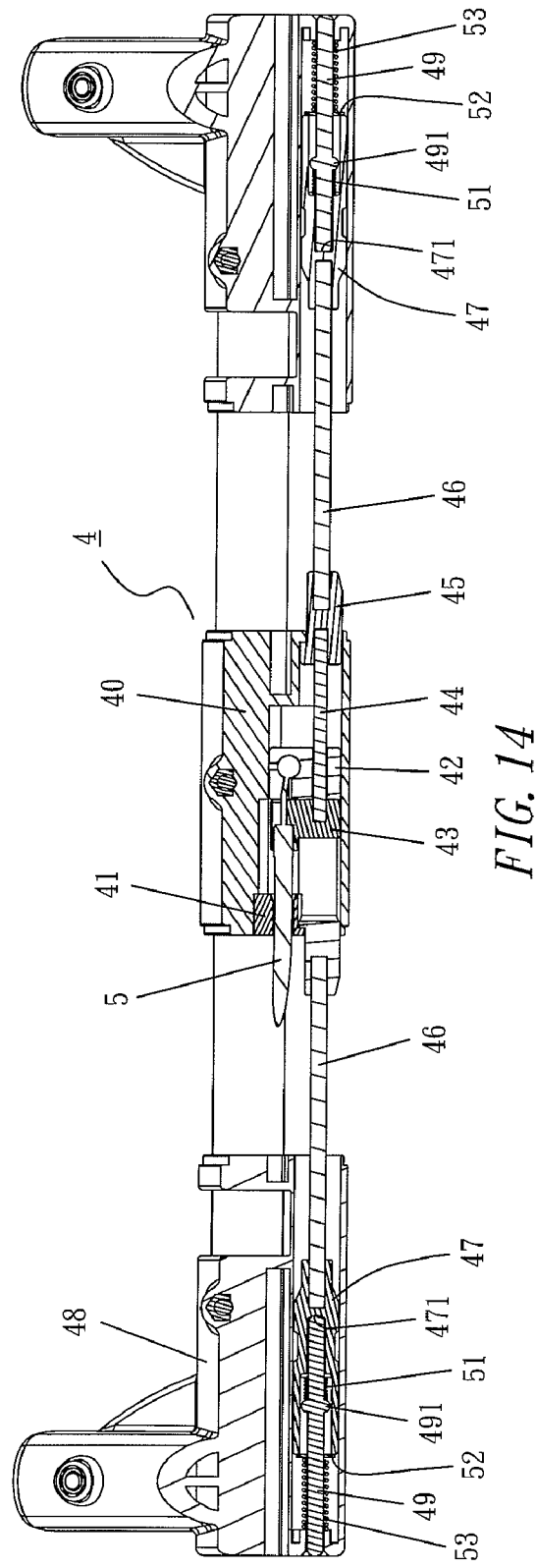
FIG. 14 is a schematic sectional view of the buffer mechanism during the braking of this invention.

During braking a cart, a buffer mechanism is activated automatically if the brake pole 49 is not aligned with the hollow of the rear wheel 35. The brake pole 49 moves toward the buffer space 471 of the buffer tin 47 to compress the buffer spring 51 so that the brake pole 49 is still in the base 48, shown in FIG. 14. Once the rear wheel 35 is rotated to align the brake pole 49 with its hollow, the hollow is penetrated by the protruded brake pole 49 through the resilient force of the springs 51, 53, which therefore accomplishes the brake, shown in FIG. 9, and avoids destruction to the wheel 35 by the brake pole 49.

Accordingly, this invention has at least the following advantages and functions:
1. The hand brake control assembly 2 is mounted on the cart frame 3, featuring a great visual sight and ease for operating.
2. The hand brake control assembly 2 is provided with a safety design for the automatic lock, which substantially prevents a lapse of releasing the brake by the user.
3. The brake pole set 4 is provided with a buffer mechanism, which avoids the destruction to the wheel 35 by the brake pole 49 during the incomplete operation of the brake.

Figure 15:
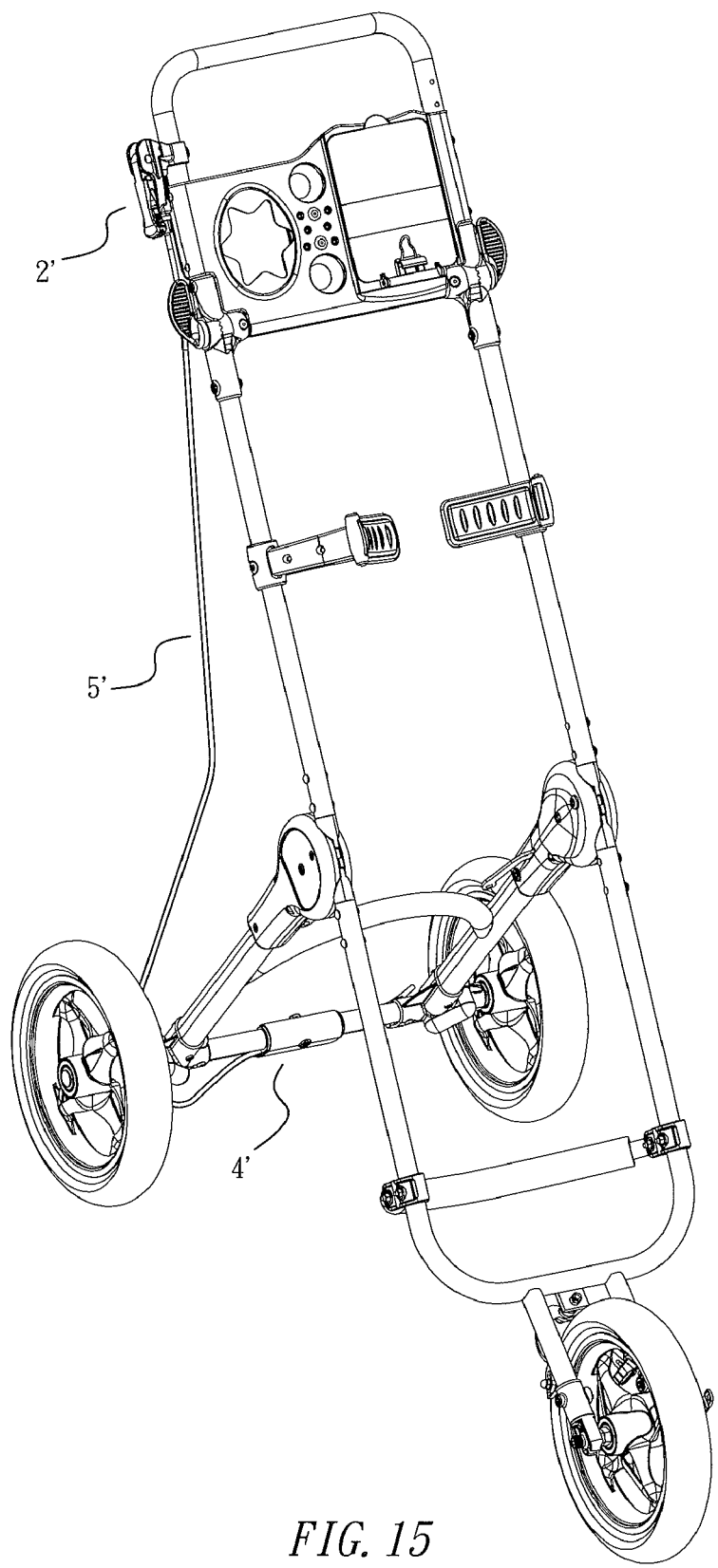
FIG. 15 is a three-dimensional view of this invention mounted on a golf bag cart.

Referring to FIG. 15, a hand brake control assembly 2', a brake pole set 4' and a brake wire 5' of the brake apparatus of this invention is available to mount on a golf bag cart, to achieve the same function with the aforementioned exemplary embodiment. This is the other exemplary embodiment of this invention.

To sum up, the disclosed structures of the exemplary embodiments of this invention are absolutely novel to the prior art. It surely can accomplish the expected objective and function, which is construed as having not only novelty and creativeness but usefulness.

What is claimed is:

1. A brake apparatus for carts with three or more wheels comprising:
    a hand brake control assembly joined fixedly on a cart frame and having a body and a lug connected pivotally thereon, wherein the body is set up with an indent at an upper inner side, with the lug provided with a springy pushbutton at each of two lateral sides, where each springy pushbutton joins a threaded element at a bottom, with the threaded element joining a clipping pin at one end, with pulling on the lug, automatically locking the clipping pin and the indent with brake release being achieved by pressing the springy pushbuttons on both lateral sides of the lug to escape the clipping pin from the indent;
    a brake pole set fixed on a rear wheel axle tube and having a binder provided with a tie mount in an interior, wherein the tie mount is provided with a slider, with the tie mount having a linking pole at each of two ends, wherein each linking pole joins a brake pole at one end and set up in a base and with a brake spring thereon; and
    a brake wire having one end penetrating the body and fixedly joined with the lug and another end penetrating the binder and the slider and fixedly joined with the tie mount.

2. A brake apparatus for carts with three or more wheels as in claim 1 wherein the linking pole joins a buffer tin set up in the base at another end, with the brake pole having a protruded part at a middle for separation purposes, wherein the other end of the linking pole located beside the protruded part and lodged in the buffer tin is put around by a buffer spring and keeps a buffer space in the buffer tin and the end of the linking pole located beside the protruded part and lodged in the base being around by a spacer and the brake spring.

3. A brake apparatus for carts with three or more wheels as in claim 1 wherein the brake wire is a brake steel rope.

* * * * *